United States Patent
Wiggermann

(10) Patent No.: US 11,241,348 B2
(45) Date of Patent: Feb. 8, 2022

(54) ENERGY MANAGEMENT FOR A STRETCHER OR OTHER OCCUPANT SUPPORT

(71) Applicant: Hill-Rom Services, Inc., Batesville, IN (US)

(72) Inventor: Neal Wiggermann, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 133 days.

(21) Appl. No.: 16/659,696

(22) Filed: Oct. 22, 2019

(65) Prior Publication Data

US 2020/0129351 A1 Apr. 30, 2020

Related U.S. Application Data

(60) Provisional application No. 62/757,220, filed on Nov. 8, 2018, provisional application No. 62/750,413, filed on Oct. 25, 2018.

(51) Int. Cl.
*A61G 7/018* (2006.01)
*A61G 1/04* (2006.01)
(Continued)

(52) U.S. Cl.
CPC ............... *A61G 7/018* (2013.01); *A61G 1/04* (2013.01); *A61G 7/015* (2013.01); *F02C 1/02* (2013.01);
(Continued)

(58) Field of Classification Search
CPC .......... A61G 7/018; A61G 1/04; A61G 7/015; F15B 1/024; F02C 6/12; F02C 1/02
See application file for complete search history.

(56) References Cited

U.S. PATENT DOCUMENTS

| 456,941 | A | * | 8/1891 | Cummings | F02C 1/02 |
|---|---|---|---|---|---|
| | | | | | 60/409 |
| 3,507,580 | A | * | 4/1970 | Howard | B60G 13/14 |
| | | | | | 417/231 |

(Continued)

FOREIGN PATENT DOCUMENTS

| CN | 107242942 A | 10/2017 |
|---|---|---|
| WO | 2011096111 A1 | 8/2011 |

OTHER PUBLICATIONS

Brief description and claims of CN107242942; A kind of Postoperative Nursing Rehabilitation Device of Neurosurgery; 6-pages; dated Oct. 24, 2019 from Google Patents.

*Primary Examiner* — Eric J Kurilla
(74) *Attorney, Agent, or Firm* — Price Heneveld LLP

(57) ABSTRACT

An occupant support includes a framework which includes a frame, an orientation adjustable deck section supported by the frame, and a lockable gas spring whose components include a piston assembly coupled to one of the frame and the deck section and a cylinder coupled to the other of the frame and the deck section. The piston assembly includes a piston and a connecting rod. The piston divides the interior of the cylinder into an isolated compartment and a non-isolated compartment. The non-isolated compartment has an inlet and an outlet. An outflow check valve resists fluid flow out of the non-isolated compartment and admits ambient fluid into the non-isolated compartment. An inflow check valve resists fluid flow into the non-isolated compartment and enables fluid flow out of the non-isolated compartment. A turbine receives fluid which flows out of the non-isolated compartment. An electrical generator is coupled to the turbine.

20 Claims, 17 Drawing Sheets

(51) Int. Cl.
   *F02C 1/02*   (2006.01)
   *A61G 7/015*  (2006.01)
   *F02C 6/12*   (2006.01)
   *F15B 1/02*   (2006.01)

(52) U.S. Cl.
   CPC .............. *F02C 6/12* (2013.01); *F15B 1/024* (2013.01); *F05D 2220/62* (2013.01); *F05D 2220/76* (2013.01)

(56) References Cited

U.S. PATENT DOCUMENTS

| | | | | |
|---|---|---|---|---|
| 3,980,152 | A * | 9/1976 | Manor | B60K 25/04 |
| | | | | 180/313 |
| 4,098,083 | A * | 7/1978 | Carman | F16H 61/4096 |
| | | | | 60/414 |
| 4,098,144 | A * | 7/1978 | Besel | B60K 6/105 |
| | | | | 74/661 |
| 6,076,208 | A * | 6/2000 | Heimbrock | A61G 7/00 |
| | | | | 5/183 |
| 6,792,633 | B1 * | 9/2004 | Ito | A61G 5/006 |
| | | | | 5/618 |
| 7,658,247 | B2 * | 2/2010 | Carter | H02J 7/345 |
| | | | | 180/65.24 |
| 7,779,493 | B2 | 8/2010 | Lemire et al. | |
| 7,805,784 | B2 | 10/2010 | Lemire et al. | |
| 9,381,125 | B2 | 7/2016 | Herbst et al. | |
| 9,615,983 | B2 | 4/2017 | Stryker et al. | |
| 10,096,995 | B2 | 10/2018 | Teggatz et al. | |
| 2002/0157185 | A1 * | 10/2002 | Heimbrock | A61G 7/018 |
| | | | | 5/618 |
| 2006/0031991 | A1 * | 2/2006 | McDaniel | A61G 7/0507 |
| | | | | 5/611 |
| 2007/0180621 | A1 * | 8/2007 | Turner | A61G 7/0755 |
| | | | | 5/618 |
| 2010/0006362 | A1 * | 1/2010 | Armstrong | F03G 7/08 |
| | | | | 180/165 |
| 2012/0266382 | A1 * | 10/2012 | Goddert | A61G 7/015 |
| | | | | 5/615 |
| 2015/0164722 | A1 * | 6/2015 | Roussy | A61G 7/0509 |
| | | | | 5/430 |
| 2016/0010457 | A1 * | 1/2016 | Striedelmeyer | F01D 5/048 |
| | | | | 416/223 A |
| 2017/0065474 | A1 * | 3/2017 | Trepanier | A61G 7/018 |
| 2017/0119607 | A1 | 5/2017 | Derenne | |
| 2018/0009458 | A1 | 1/2018 | Carter | |

* cited by examiner

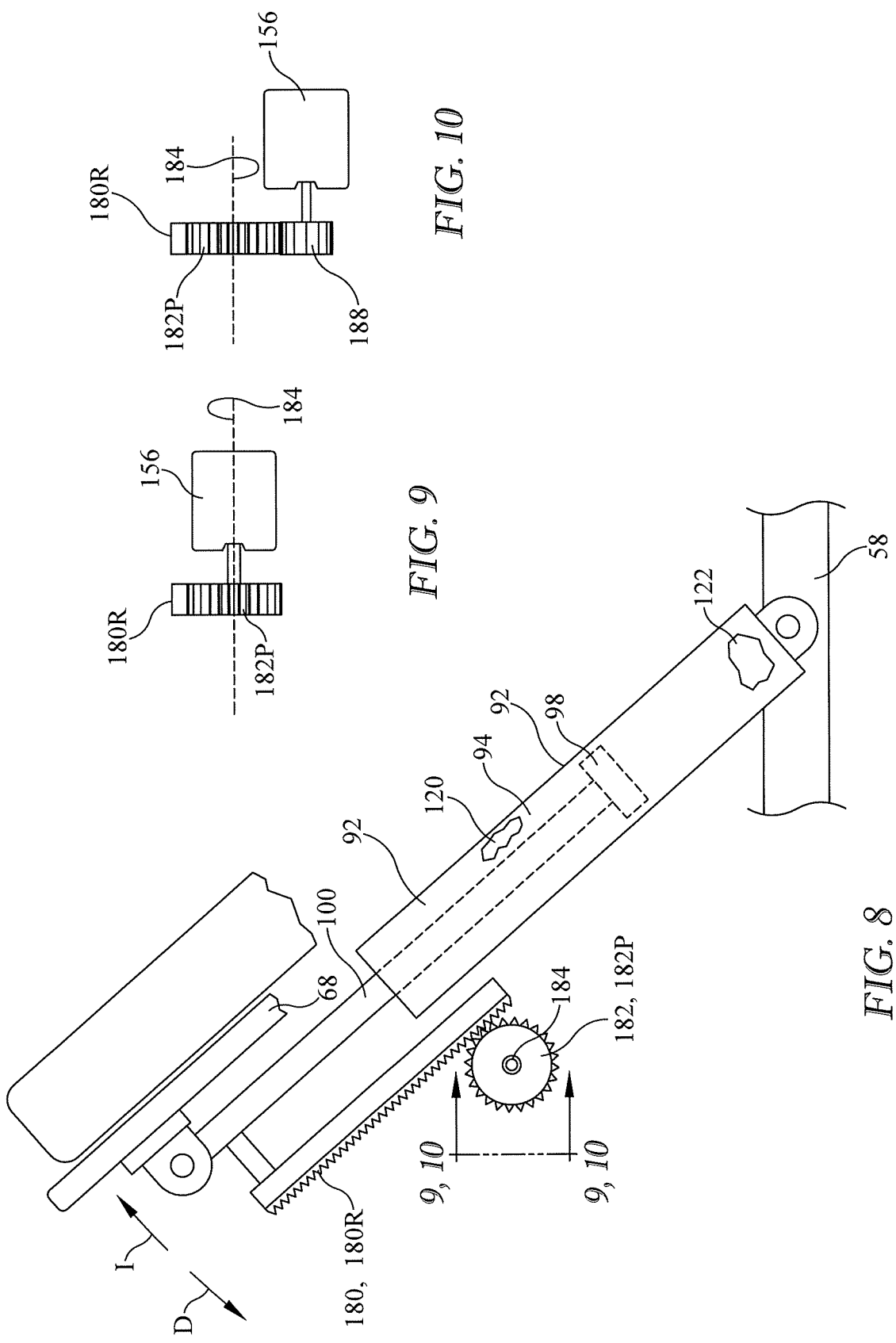

ENERGY MANAGEMENT FOR A STRETCHER OR OTHER OCCUPANT SUPPORT

CROSS REFERENCE TO RELATED APPLICATIONS

This application claims priority to U.S. Provisional Patent Applications 62/750,413, entitled "Energy Harvesting to Power Stretcher Electronics" filed on Oct. 25, 2018 and 62/757,220 entitled "Energy Management for a Stretcher or Other Occupant Support" filed on Nov. 8, 2018, the disclosures of which are expressly incorporated herein by reference.

TECHNICAL FIELD

The subject matter described herein relates to occupant supports such a stretchers, and particularly to arrangements which reallocate or harvest energy to power components of the occupant support.

BACKGROUND

An occupant support, such as a stretcher used in a health care setting, may include various electrical components. The stretcher may also include an on-board battery to provide electrical energy to the electrical components. The stretcher may also include a charging system. The charging system is connectable to mains power to replenish the charge of a battery which is not fully charged and to maintain the charge on a fully charged battery.

The stretcher is not always connected to mains power, for example when it is being used to transport an occupant thereof. In addition, if an occupied or unoccupied stretcher is stationary (i.e. not being used to transport an occupant) it may be too far away from an electrical outlet to be connected to mains power, or a caregiver may simply forget to make the connection. As a result, the expenditure of battery charge which occurred during prior use of the stretcher may render the battery insufficiently charged for the next use.

Therefore, it is desirable to include features which will help ensure the availability of electrical energy to the electrical components of a stretcher whose battery is at less than full charge.

SUMMARY

An occupant support includes a framework comprised of a frame which includes at least a base frame which is not elevation adjustable. The frame may also include an elevatable frame supported by the base frame and which is elevation adjustable relative to the base frame. The occupant support also includes an orientation adjustable deck section supported by the frame. A lockable gas spring includes a piston assembly coupled to one of the frame and the deck section and a cylinder coupled to the other of the frame and the deck section. A piston divides the interior of the cylinder into an isolated compartment and a non-isolated compartment. The non-isolated compartment has an inlet, an outflow check valve, an outlet, and an inflow check valve. The outflow check valve resists fluid flow out of the non-isolated compartment and admits fluid from the environment of the gas spring into the non-isolated compartment. The inflow check valve resists fluid flow into the non-isolated compartment and enables fluid flow out of the non-isolated compartment. The occupant support also includes a turbine and an electric generator coupled to the turbine.

In operation, reducing the angular orientation of the orientation adjustable deck section causes gas in the non-isolated compartment to flow through the turbine, thereby rotating the turbine and the generator so that the generator produces electrical energy. Increasing the angular orientation of the orientation adjustable deck section draws ambient air back into the non-isolated compartment, making it available to rotate the turbine the next time the angular orientation of the deck section is reduced.

BRIEF DESCRIPTION OF THE DRAWINGS

The foregoing and other features of the various embodiments of the occupant support and energy management system described herein will become more apparent from the following detailed description and the accompanying drawings in which:

FIGS. 8-9 show variants of a third embodiment of a stretcher with a rack and pinion arrangement for generating electrical energy.

FIG. 10 shows a variant similar to that of FIGS. 8-9 with a speed amplification gear.

DETAILED DESCRIPTION

Figure 1:
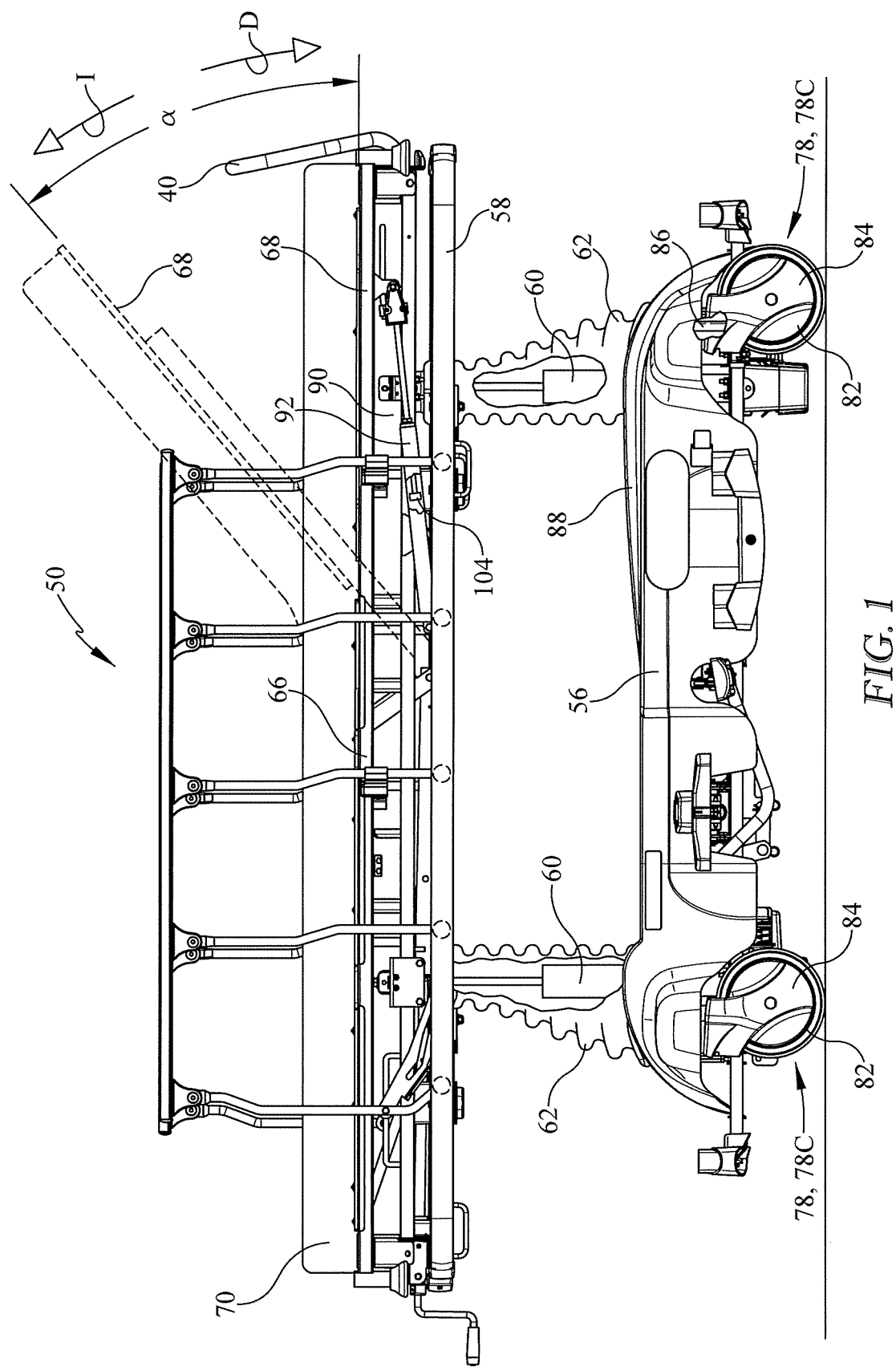
FIG. 1 is a side elevation view of a stretcher.

The present invention may comprise one or more of the features recited in the appended claims and/or one or more of the following features or combinations thereof.

In this specification and drawings, features similar to or the same as features already described may be identified by reference characters or numerals which are the same as or similar to those previously used. Similar elements may be identified by a common reference character or numeral, with suffixes being used to refer to specific occurrences of the element. Examples given in this application are prophetic examples.

Figure 2:
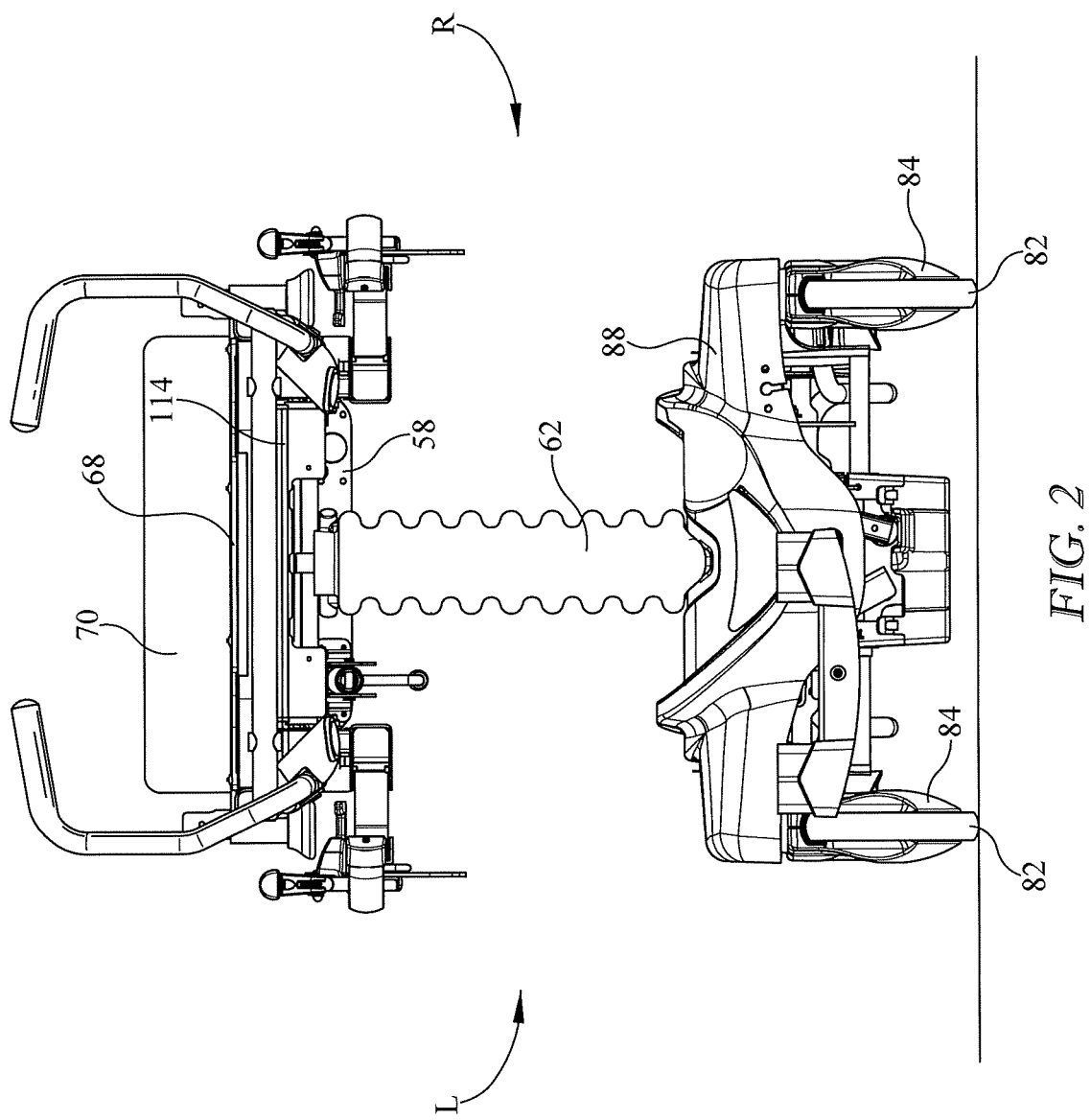
FIG. 2 is a head end elevation view of the stretcher.

Referring to FIGS. 1 and 2, a stretcher 50 extends longitudinally from a head end H to a foot end F and laterally from a left side L to a right side R where left and right are taken from the perspective of a supine occupant of the stretcher.

The stretcher includes a framework comprised of a frame which includes at least a base frame 56 which is not elevation adjustable. The frame of the illustrated stretcher also includes an elevatable frame 58 supported on the base frame by head end and foot end hydraulic cylinders 60, each of which is housed inside a flexible boot 62. The hydraulic cylinders enable vertical adjustment of the elevatable frame relative to the base frame. The frame supports a deck which includes a lower body deck section 66 corresponding approximately to the buttocks, legs and feet of an occupant of the stretcher, and a torso section 68 corresponding approximately to the torso and head of the occupant. The deck supports a mattress 70. A shroud 88 covers a variety of components attached to the base frame. A handle 40 enables a user to push, pull, or otherwise maneuver the stretcher.

The stretcher also includes a set of rolling element assemblies 78, for example casters 78C. Each caster comprises a wheel 82 and a wheel cover 84 in the form of a fork.

Figure 3:
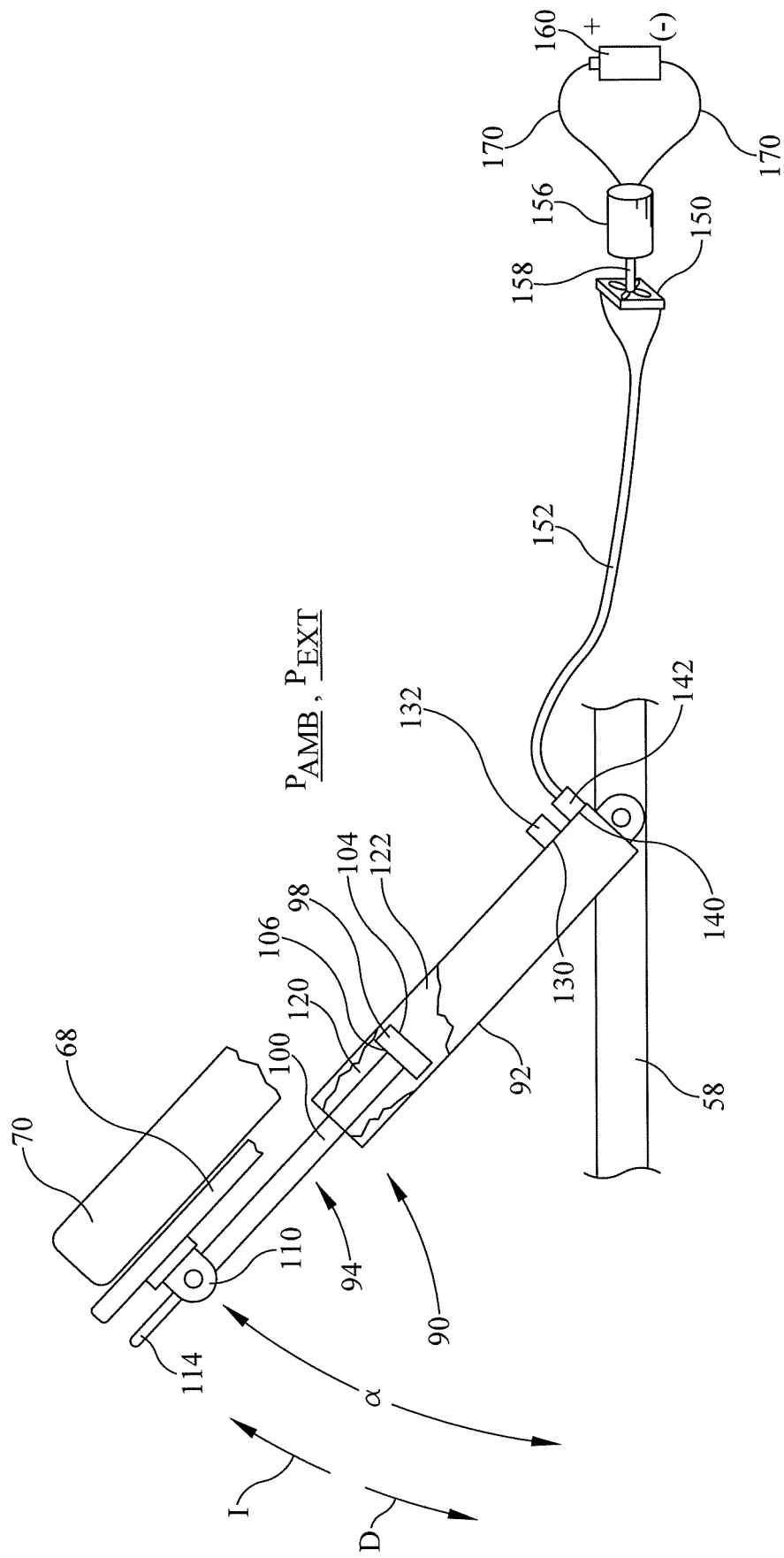
FIG. 3 is a side elevation view of selected stretcher components showing a first embodiment of a stretcher and energy management system which includes check valves for regulating gas flow into and out of a non-isolated compartment of a gas spring.

Referring additionally to FIG. 3, a gas spring 90 includes a cylinder 92 and a piston assembly 94 comprised of a piston 98 circumscribed by the cylinder and a connecting rod 100 extending from the piston. The piston has a first face 104 opposite the connecting rod and a second face 106, opposite the first face. Connecting rod 100 is rotatably coupled to a lug 110 extending from the deck torso section. Cylinder 92 is rotatably coupled to elevatable frame 58. In an alternative arrangement the connecting rod is coupled to the frame, and the cylinder is coupled to the torso section. Either way, translation of the piston within the cylinder causes a change of the angle of orientation a of the torso section relative to the frame. A change in rotational sense I is referred to as an increase in the angle or an elevation or raising of the torso section. A change in rotational sense D is referred to as a decrease in the angle or a flattening or lowering of the torso section.

A gas spring lock, not illustrated, has an engaged or locked state in which it prevents relative movement between gas spring piston assembly 94 and cylinder 92, and therefore holds torso section 68 at a user selected orientation relative to frame 58. The engaged state is the default state of the lock. In order to change the orientation of the torso section a user presses up on a release handle 114, portions of which are visible in FIGS. 2 and 3. Such operation disengages the lock enabling the user to adjust the deck section orientation angle α. The gas spring provides assistance for orientation changes in rotational sense I and provides resistance, sometimes referred to as damping, for orientation changes in rotational sense D. The assistance provided in rotational sense I relieves the caregiver of some of the burden of raising the torso section, which is particularly helpful when an occupant's torso is supported by torso section 68. The resistance provided in rotational sense D helps the caregiver lower of the torso section gently and in a controlled manner.

FIG. 3 shows a first embodiment of an energy management system for the stretcher. Gas spring piston 98 divides the interior of the cylinder into an isolated gas compartment 120 and a non-isolated gas compartment 122. Compartment 120 is referred to as an isolated compartment because it, and any gas or other fluid contained therein, is not in fluid communication with the ambient environment or with any component outside the compartment. Compartment 122 is referred to as a non-isolated compartment because it, and any gas or other fluid contained therein, is in fluid communication with the ambient environment and/or with a component outside the compartment, as described in more detail below. As is evident from FIG. 3, translation of piston 98 within cylinder 92 causes the volumes of compartments 120, 122 to change so that as the volume of one compartment increases the volume of the other decreases.

The non-isolated compartment includes an inlet 130. An outflow check valve 132 resists gas flow out of the non-isolated compartment by way of inlet 130. However when pressure $P_{122}$ in compartment 122 is sufficiently lower than ambient pressure $P_{AMB}$, the valve cracks open and admits ambient air into the non-isolated compartment.

The non-isolated compartment also includes an outlet 140. An inflow check valve 142 regulates fluid flow through the outlet. Inflow check valve 142 is subjected to a compartment pressure $P_{122}$ and an external pressure $P_{EXT}$. In the illustrated arrangement the external pressure is ambient pressure $P_{AMB}$. Inflow check valve 142 resists gas flow into the non-isolated compartment by way of outlet 140. However when compartment pressure $P_{122}$ is sufficiently higher than external pressure $P_{EXT}$, the valve cracks open and enables gas flow out of the non-isolated compartment.

An energy conversion device is arranged to receive pressurized gas which flows out of isolated compartment 122. The energy conversion device converts energy of the pressurized gas to another form. In this application the energy conversion device is a turbine 150. The turbine converts the energy of a stream of pressurized gas to rotational motion of the turbine which may be drive a generator which converts the rotational motion to electrical energy. A conduit 152 may be provided to ensure that the bulk of the gas flow out of compartment 122 arrives at and powers turbine 150 rather than diffusing unproductively into the environment. If the conduit is not provided, turbine 150 is located close enough to outlet 140 to ensure acceptable powering of the turbine. An electrical generator 156 is coupled to the turbine by drive shaft 158. The generator is connected to an appliance by wiring 170. The illustrated appliance is a battery 160.

In operation, when a user lowers torso deck section 68 (rotational sense D) gas pressure in compartment 122 increases thereby closing outflow check valve 132 (if it is not already closed). When compartment pressure $P_{122}$ sufficiently exceeds external pressure $P_{EXT}$, inflow check valve 142 cracks open and enables the pressurized gas from compartment 122 to flow to and rotate turbine 150 thereby rotating generator 156. Rotation of the generator tops up the charge on battery 160. Circuitry may be provided to prevent overcharging. The gas spring of FIG. 3, like the gas spring of FIG. 1, helps resist lowering of the torso section, partly because energy is consumed pressurizing the gas in non-isolated compartment 122, and partly because energy is consumed powering the generator.

When a user raises torso deck section 68, the volume of non-isolated compartment 122 increases thereby reducing gas pressure therein. Inflow check valve 142 closes, and outflow check valve 132 opens thereby admitting ambient air into the non-isolated compartment by way of inlet 130.

The admitted air is then available to operate turbine 150 and generator 158 the next time torso section 68 is lowered, as described above.

Figure 4:
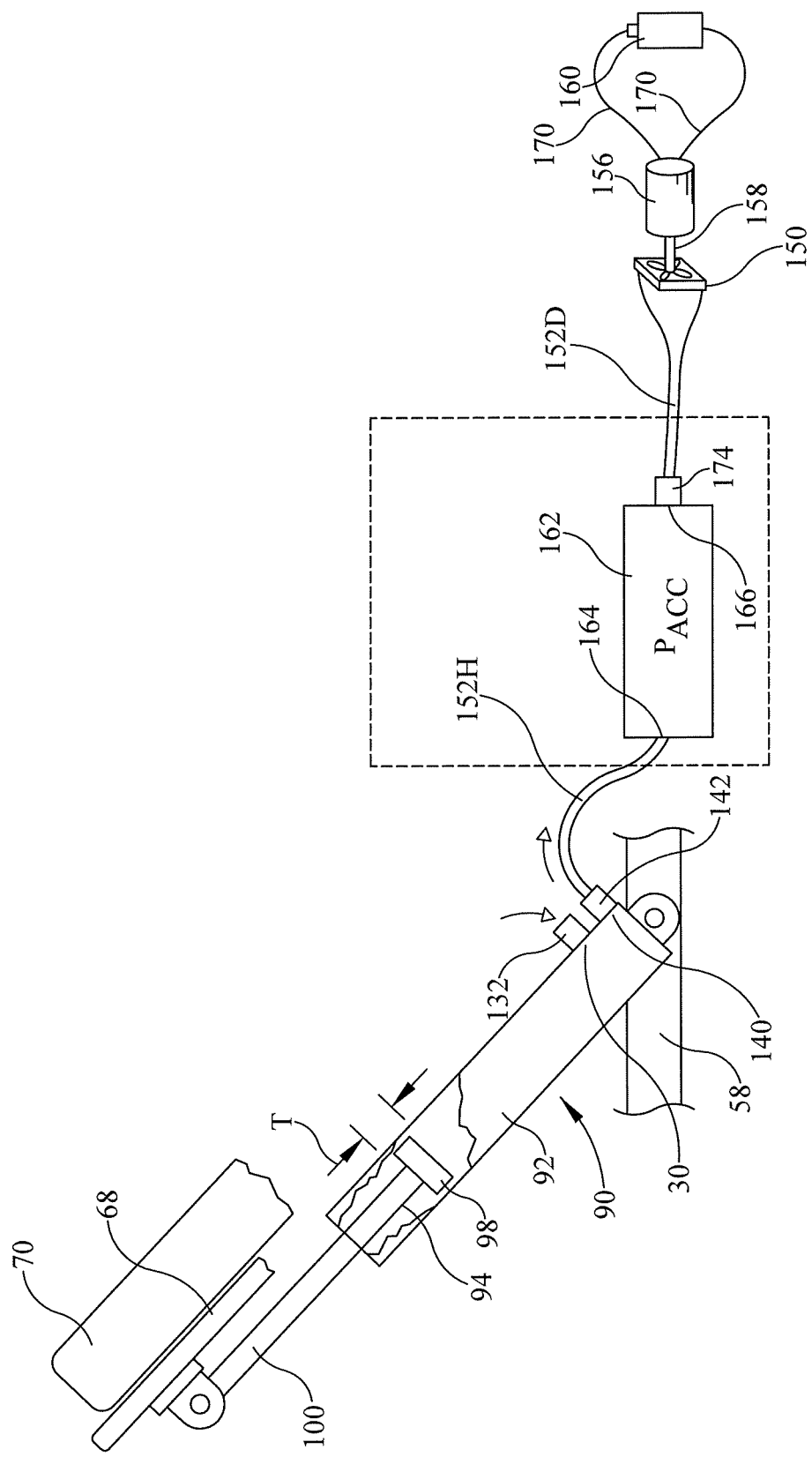
FIG. 4 is a side elevation view similar to FIG. 3 showing a variant which includes a pressure vessel which is also referred to herein as an accumulator.

FIG. 4 shows a variant of the embodiment of the stretcher and energy management system of FIG. 3. The embodiment of FIG. 4 includes an accumulator 162 flowisely intermediate inflow check valve 142 and turbine 150. The accumulator includes an intake 164 and a discharge port 166. A reverse flow check valve 174 regulates fluid flow through the discharge port. The reverse flow check valve is subjected to an accumulator pressure $P_{ACC}$ and an external pressure $P_{EXT}$. In the illustrated arrangement the external pressure is ambient pressure $P_{AMB}$. Reverse flow check valve 174 resists gas flow into the accumulator by way of discharge port 166. However when accumulator pressure $P_{ACC}$ is sufficiently higher than external pressure $P_{EXT}$, the valve cracks open and enables gas flow out of the accumulator. As illustrated, conduit 152 is segmented into an upstream segment 152U extending from the inflow check valve 142 to accumulator intake 164 and a downstream segment 152D extending from accumulator reverse flow check valve 174 to turbine 150, however other relationships between accumulator 162 and conduit 152 may be equally satisfactory.

Operation of the embodiment of FIG. 4 is similar to that of the embodiment of FIG. 3 except that gas flowing out of non-isolated compartment 122 enters accumulator 162 rather than being delivered directly to turbine 150. Gas accumulates in the accumulator until its pressure $P_{ACC}$ exceeds the crack point of reverse flow check valve 174. Opening of reverse flow check valve 174 enables the pressurized gas from accumulator 162 to flow to and rotate turbine 150 thereby rotating generator 156.

The embodiment of FIG. 3 supplies pressurized gas to turbine 150 each time torso deck section 68 is lowered. By contrast, the embodiment of FIG. 4 accumulates pressurized gas resulting from more than a single lowering of the torso deck section before supplying that gas to the turbine. Accordingly, the turbine of FIG. 3 is powered more frequently but less vigorously than the turbine of FIG. 4. Conversely the turbine of FIG. 4 is powered less frequently but more vigorously than the turbine of FIG. 3.

In one variant of the energy management arrangement the lockability of the gas spring is permissive. Permissive lockability means that when the lock is engaged, the lock nevertheless permits a small amount of translation of piston 98 within cylinder 92 as indicated by double headed arrow T of FIG. 4. The small translations may be provoked by, for example, vibrations that occur when a user rolls the stretcher along the floor. Taking the embodiment of FIG. 4 as an example, these small translations harvest the energy of the vibrations, progressively compressing the gas in the accumulator. When the accumulator pressure reaches the check valve cracking point, the check valve opens, allowing the pressurized gas to discharge from the accumulator and spin the turbine, thereby turning the generator and adding charge to the battery. The amplitude T of the translation is a design tradeoff between taking advantage of the opportunity for energy harvesting and keeping the resulting oscillations of deck section orientation angle α within acceptable limits.

The gas spring of FIGS. 3 and 4, unlike the gas spring of FIG. 1, does not provide any meaningful assistance for raising the torso deck section 68 because the pressure acting on piston face 104 of FIG. 3 or 4 is considerably lower than the pressure acting on piston face 104 of FIG. 1.

Figure 5:
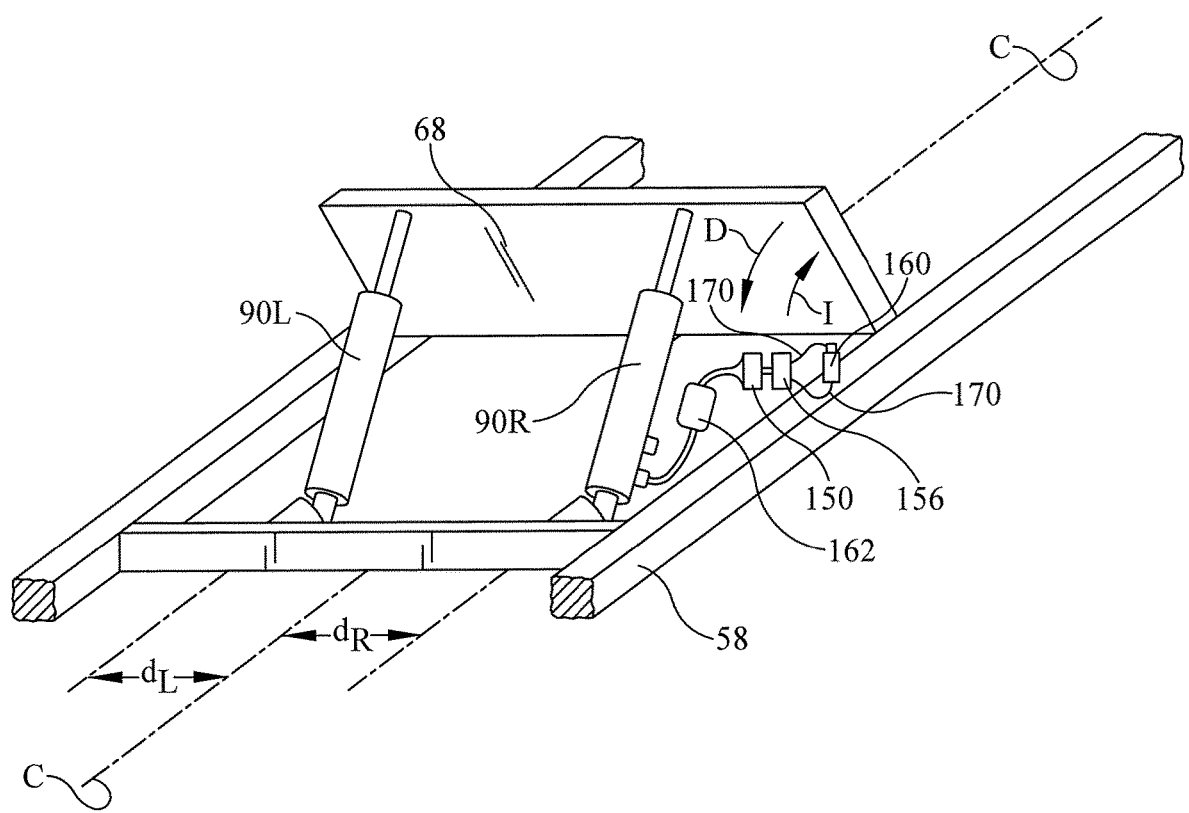
FIG. 5 is a perspective view of selected components of a stretcher having both a conventional gas spring and the gas spring of FIG. 4 for adjusting the orientation of a deck section.

FIG. 5 shows a variant of the occupant support which compensates for the fact that the gas springs of FIGS. 3 and 4, unlike the gas spring of FIG. 1, do not provide any meaningful assistance for raising the torso deck section 68. The stretcher shown in FIG. 5 includes a left gas spring 90L of conventional design laterally offset to the left of stretcher centerline C by a distance $d_L$. The stretcher also includes a right gas spring 90R of the type shown in FIG. 4 laterally offset to the right of stretcher centerline C by a distance $d_R$. (The gas spring of FIG. 3 could be used instead of the gas spring of FIG. 4.) Gas spring 90R provides the energy management capability described above. Gas spring 90L does not provide an energy management function but does provide lift assistance not available from gas spring 90R.

In summary, the stretcher of FIG. 5 includes a first gas spring 90R as already described in connection with FIG. 3 or FIG. 4. The stretcher of FIG. 5 also includes a second gas spring 90L whose components include a piston assembly coupled to one of the frame and the deck section and a cylinder coupled to the other of the frame and the deck section. Both gas springs resist changes in angular orientation of deck section 68 from a first orientation to a second orientation which is more horizontal than the first orientation (orientation changes in rotational sense D). The second gas spring assists changes in angular orientation of the deck section from the second orientation to the first orientation (orientation changes in rotational sense I).

The design specifications of each of the gas springs 90L and 90R may be selected so that the two gas springs, acting together, offer a satisfactory combination of energy management, assistance in rotational sense I and resistance in rotational sense D. Although FIG. 5 shows gas cylinders 90L, 90R as laterally equally offset from centerline C ($d_L=d_R$) unequal offsets may be used, if desired, to compensate for performance differences in the two gas springs, for example the dominance of gas spring 90L in providing assistance in rotational sense I.

Figure 6:
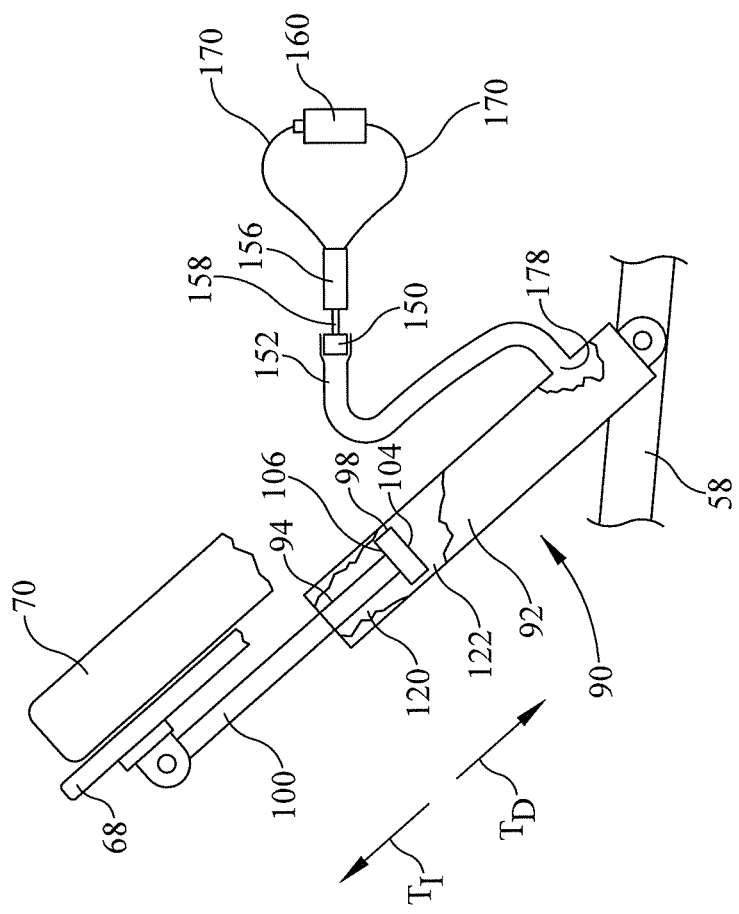

FIG. 6 shows a second embodiment of the energy management system. The embodiment of FIG. 6 is similar to that of FIG. 3 in that gas spring 90 includes an isolated compartment 122 defined in part by second face 106 of piston 98, and a non-isolated compartment 120 defined in part by first face 104 of piston 98. However the embodiment of FIG. 6 includes a bidirectional flow opening 178, and does not include check valves. The bidirectional opening establishes fluid communication between non-isolated compartment 122 and the ambient environment or with a component outside the compartment. As illustrated, a conduit 152 extends between the opening of the non-isolated compartment and turbine 150.

In summary, the stretcher of FIG. 6 includes a frame 58 and an orientation adjustable deck section 68 supported by the frame. The stretcher also includes a lockable gas spring 90 whose components include a piston assembly 94 coupled to one of the frame and the deck section and a cylinder 92 coupled to the other of the frame and the deck section. The piston assembly includes a piston 98 and a connecting rod 100. The piston divides the interior of the cylinder into an isolated compartment 120 and a non-isolated compartment 122. The non-isolated compartment is in fluid communication with a turbine 150. A conduit 152 extending from the non-isolated compartment to the turbine may be provided to facilitate productive fluid communication. As with previously described embodiments and variants thereof, an electrical generator 156 is coupled to the turbine.

In operation, when piston 98 translates in direction TD as a result of lowering deck section 68, gas flows out of compartment 122 and forwardly through turbine 150. The gas flow rotates the turbine thereby rotating generator 156 and supplying energy to battery 160.

When piston 98 translates in direction T₁ as a result of raising deck section 68, the resulting pressure reduction in compartment 122 causes reverse flow of gas (environmental air) into compartment 122 by way of turbine 156 and conduit 152. The gas flow spins the turbine and therefore generator 158 to supply energy to battery 160.

Stated more generally, when the piston moves longitudinally within the cylinder in conjunction with a change of orientation of the deck section, the volumes of the isolated compartment and the non-isolated compartment change. A decrease in the volume of the non-isolated compartment expels air out of the non-isolated compartment and through the turbine in a first or forward direction. An increase in the volume of the non-isolated compartment draws air through the turbine in a second or reverse direction and into the non-isolated compartment. Either way the gas flow spins the turbine and the generator.

Figure 7:
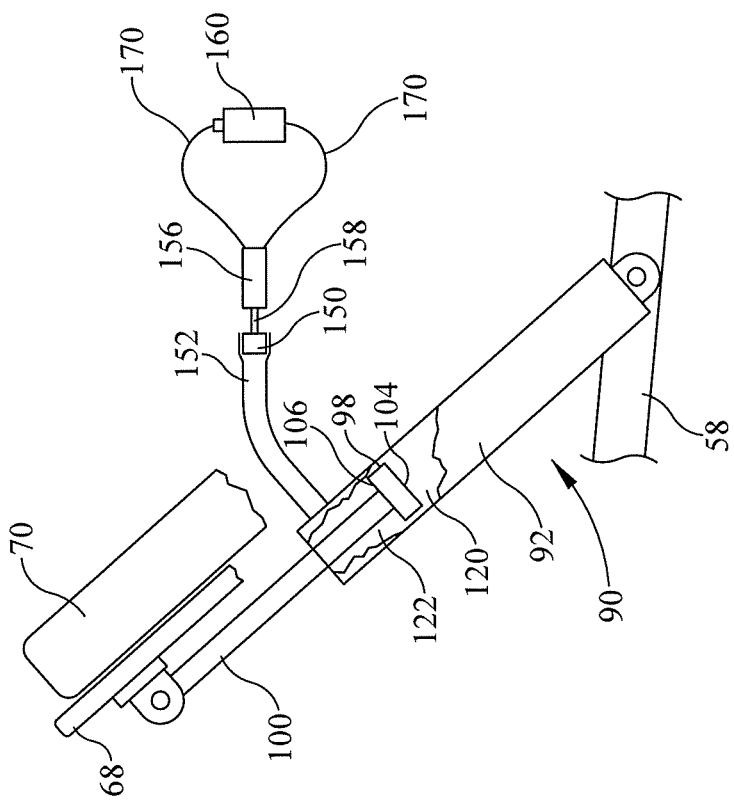
FIGS. 6-7 show variants of a second embodiment of a stretcher which do not include check valves for regulating gas flow into and out of a non-isolated compartment of a gas spring.

FIG. 7 shows a variant of the second embodiment. The embodiment of FIG. 7 is the same as the embodiment of FIG. 6 except that non-isolated compartment 122 is the compartment defined partly by second face 106 of piston 98, and isolated compartment 120 is the compartment defined partly by first face 104 of the piston.

FIG. 8 shows a third embodiment of the stretcher and energy management system. The stretcher includes a frame 58 and an orientation adjustable deck section 68 supported by the frame. A gas spring 90 includes a piston assembly 94 coupled the deck section and a cylinder 92 coupled to the frame. The gas spring includes a driving element 180, for example a rack 180R. The rack is affixed to connecting rod 100 of the piston assembly so that it is co-translatable with the connecting rod as the piston assembly translates relative to cylinder 92 in response to changes in the angular orientation of deck section 68.

The energy management system of the stretcher also includes a driven element 182 adapted to be driven by the driving element in response to a change in orientation of the deck section. In the illustrated example the driven element is a pinion gear 182P having a rotational axis 184. The teeth of the pinion mesh with the teeth of the rack so that translation of the rack rotates the pinion about its rotational axis.

As seen in FIG. 9 an electrical generator 156 is directly coupled to the pinion. As seen in FIG. 10 a generator 156 is indirectly coupled to the pinion by way of an intervening speed amplification gear 188.

FIG. 8 shows an arrangement in which the gas spring component coupled to the deck section is the piston assembly. Rack 180R is co-translatable with the piston assembly. Pinion 182P is translationally fixed relative to the piston assembly but rotates with deck torso section 68 in rotational senses I, D. Other kinematic arrangements which may also be satisfactory are briefly described below.

Figure 11:
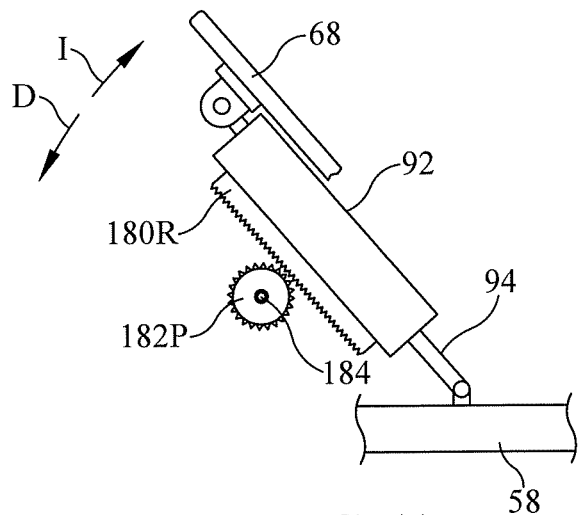
FIGS. 11-13 show kinematic variations of the embodiment of FIG. 8.

FIG. 11 shows an arrangement in which the gas spring component coupled to the deck section is cylinder 92. Rack 180R is affixed to and is co-translatable with the cylinder. Pinion 182P is translationally fixed relative to the cylinder but rotates with deck torso section 68 in rotational senses I, D.

Figure 12:
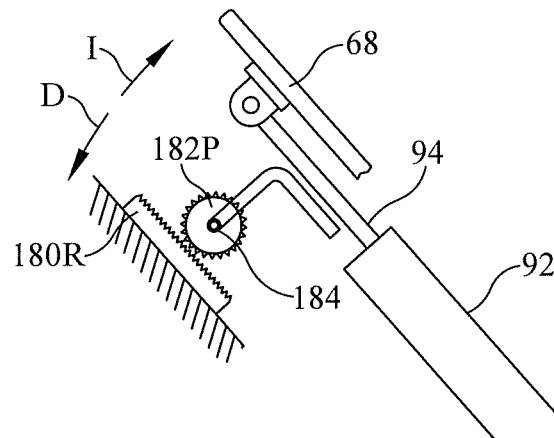

FIG. 12 shows an arrangement in which the gas spring component coupled to the deck section is piston assembly 94. Pinion gear 182P and generator 156 (which is not visible in FIG. 12) are co-translatable with the piston assembly. Rack 180R is translationally fixed relative to the piston assembly but rotates with deck torso section 68 in rotational senses I, D.

Figure 13:
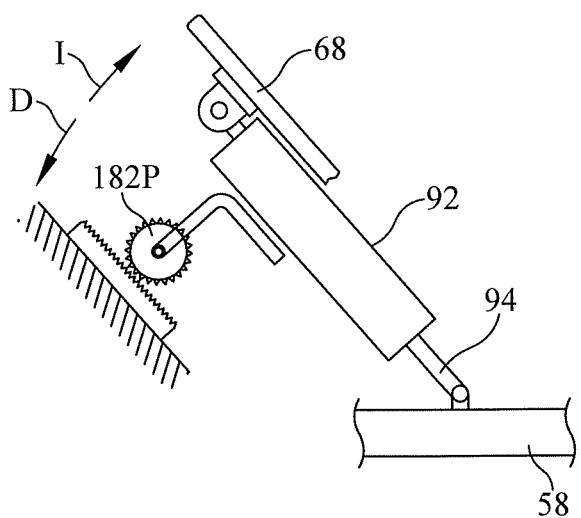

FIG. 13 shows an arrangement in which the gas spring component coupled to the deck section is cylinder 92. Pinion gear 182P and generator 156 (which is not visible in FIG. 13) are co-translatable with the cylinder. Pinion 182P is translationally fixed relative to the cylinder but rotates with deck torso section 68 in rotational senses I, D.

Figure 14:
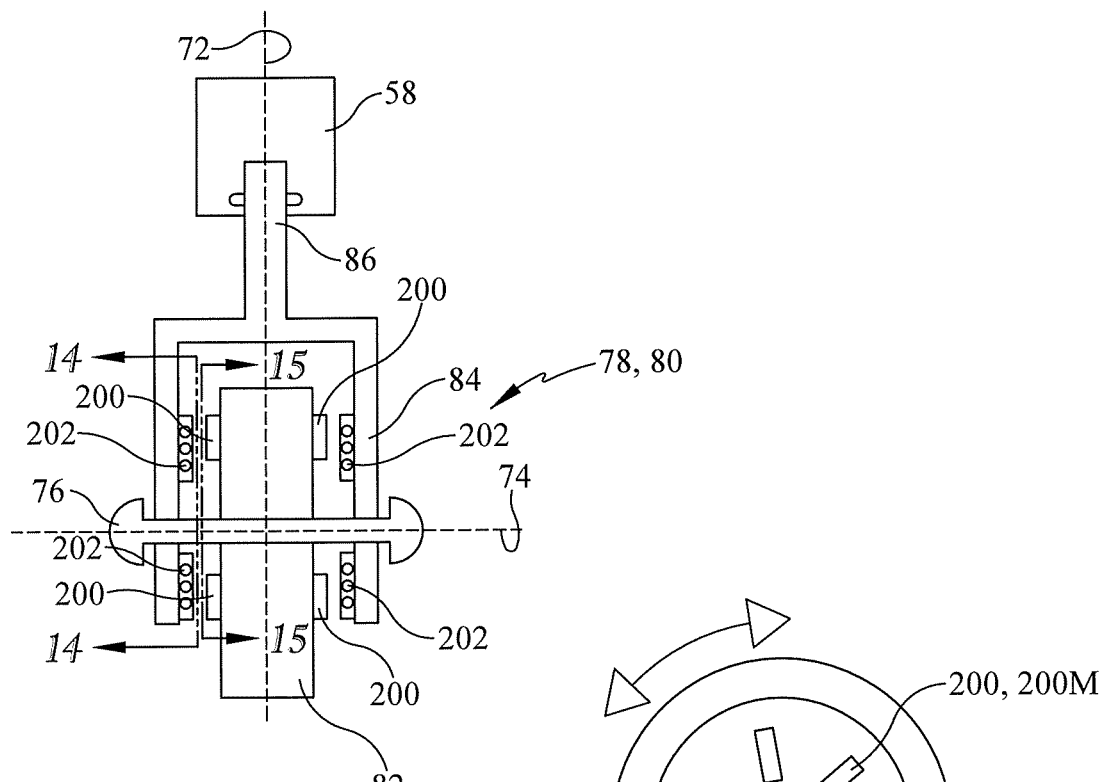
FIGS. 14-16 show a fourth embodiment in which first and second electrical generator elements are integrated into components of a caster assembly.
Figure 15:
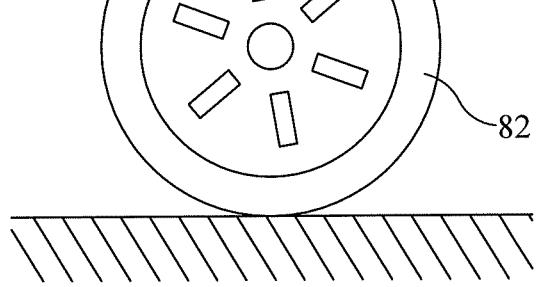
Figure 16:
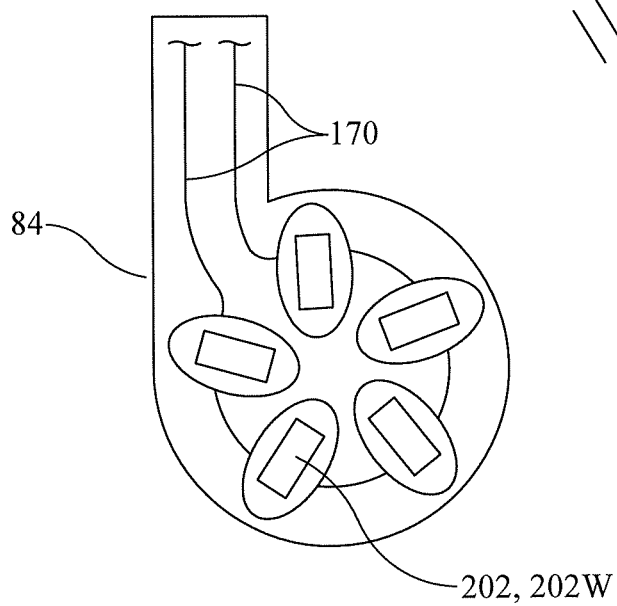

FIGS. 14-16 show a fourth embodiment of an energy management system for an occupant support, such as a stretcher. The occupant support includes a frame 58 and a rolling element assembly 78 affixed to the frame. The rolling element assembly is a caster 78C comprised of a stem 86 attached to frame 58 and a cover 84 in the form of a fork. The caster also includes a rolling element such as wheel 82 embraced by the fork and connected thereto by an axle 76 so that the wheel is rotatable about a wheel rotational axis 74. Cover or fork 84 may be pivotable relative to the frame about a pivot axis 72 but is nonrotatable about rotational axis 74.

A first generator element 200 is affixed to the nonrotatable cover. A second generator element 202 is affixed to the wheel. In the illustrated variant the first generator element is an array of magnets 200M, and the second generator element is a winding or windings 202W integrated into the cover. In another variant the first generator element is the winding or windings while the second generator element is the array of magnets.

The first and second generator elements comprise an electric generator. A control system may be configured so that the generator provides energy selectively based on one or more parameters. Suitable parameters or combinations of parameters include 1) the speed at which the occupant support is moving or the caster wheel is rotating, 2) acceleration or deceleration of the stretcher 3) the angle of inclination of the stretcher relative to the geographic horizon in combination with the direction of movement of the stretcher, and 4) the direction of force exerted on handles 40 in combination with the direction of movement of the stretcher.

For example if the stretcher is translating slowly, that may be an indication that a user is attempting to accelerate a previously stationary stretcher. Therefore it may be inadvisable to channel any of the user's energy to some other purpose. However if the stretcher is translating at a higher speed, that may be an indication that the user has accelerated the stretcher to a desired speed. Therefore it may be acceptable to harvest some of that energy.

Similarly, an indication of stretcher acceleration may be a signal that a user is attempting to overcome the inertia of the stretcher in order to increase its speed of translation, in which case it may be inadvisable to divert the user's energy to another purpose. An indication of stretcher deceleration may be a signal that a user is attempting to overcome the inertia of a moving stretcher in order to decrease its speed of translation, in which case it may be acceptable, or even desirable to divert energy to another purpose in order to assist the deceleration.

A stretcher which is determined to be on an incline and moving up the incline may not be a candidate for energy harvesting whereas a stretcher which is moving down the incline may be a candidate for energy harvesting.

If a stretcher which is determined to be moving in a given direction (e.g. forwardly or backwardly) and is also determined to be experiencing a force on handle 40 which tends to reinforce the movement of the stretcher, that may be an indication that a user is exerting energy to propel the stretcher. Therefore energy harvesting may not be appropriate. However if the stretcher is determined to be moving in a given direction and is also determined to be experiencing a force on handle 40 which tends to oppose the movement of the stretcher, that may be an indication that a user is exerting energy to slow the movement of the stretcher or bring it to a stop. Therefore energy harvesting may be appropriate or even beneficial for assisting the deceleration.

Figure 17:
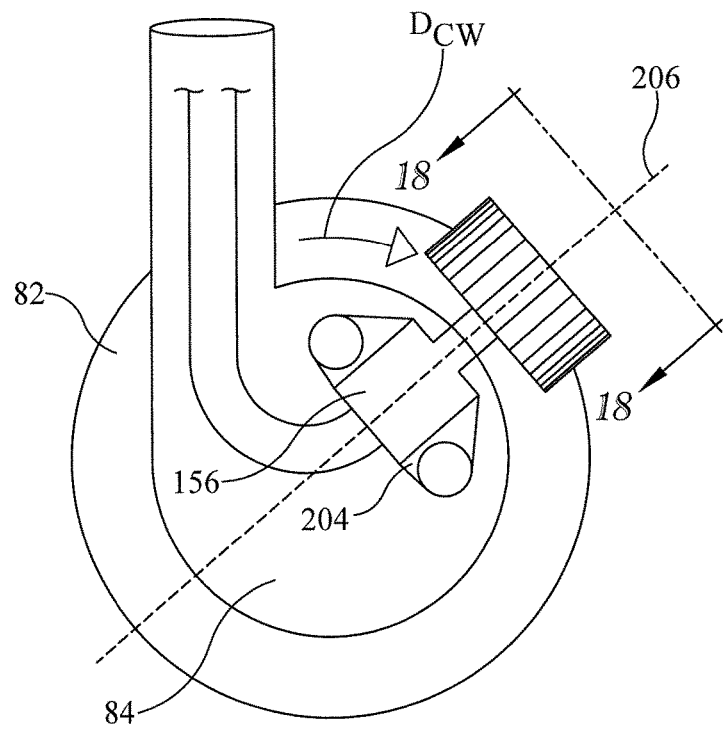
FIGS. 17-18 show a fifth embodiment in which an electric generator is affixed to the stretcher so that a rotor thereof is rotatably driven by rotation of the rolling element of a caster.
Figure 18:
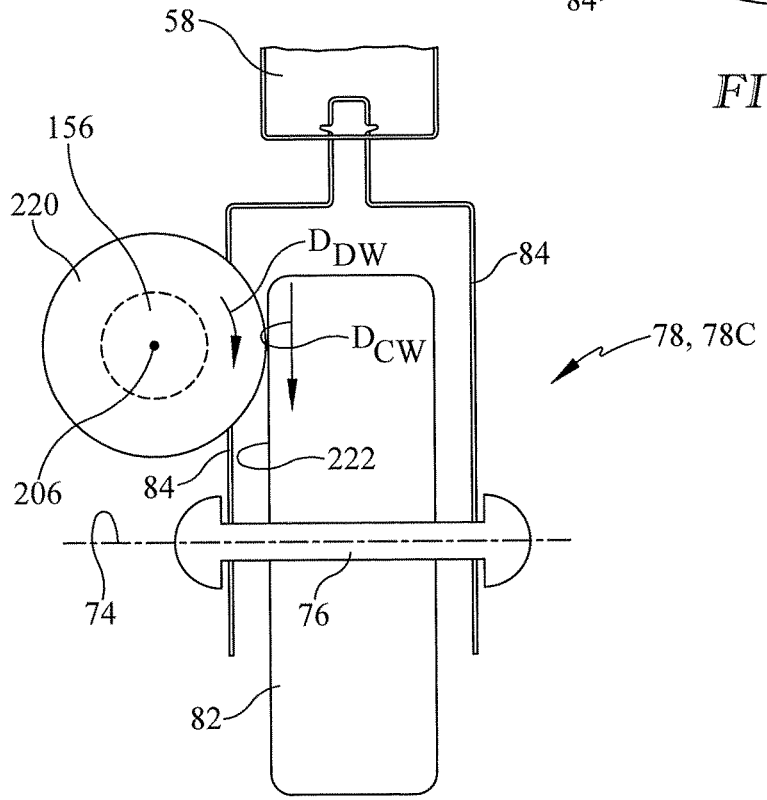

FIGS. 17-18 show a fifth embodiment of an energy management system for an occupant support, such as a stretcher. The occupant support includes a frame 58 and a rolling element assembly 78 such as a caster 78C affixed to the frame. The caster includes a cover 84 and a rolling element such as a wheel 82 having an axis of rotation 74.

An electric generator 156 is affixed to the occupant support. In the illustrated embodiment the generator is affixed to caster cover 84 by a bracket 204. The generator includes a rotor, not visible, which is rotatable about a rotor axis 206. A drive wheel 220 is connected to the generator rotor and is rotatable therewith about rotor axis 206. The drive wheel is also in contact with one sidewall 222 of caster wheel 82.

In operation, when the stretcher is rolled by a caregiver, caster wheel 82 rotates about axis 74, e.g. in rotational sense $D_{cw}$. Contact between the caster wheel and drive wheel 220 causes the drive wheel to rotate about axis 206 in rotational sense $D_{cw}$ thereby driving the generator.

As with the embodiment of FIGS. 14-16, the embodiment of FIGS. 17-18 may employ a control system configured so that the generator provides energy selectively based on one or more parameters. The examples given in connection with FIGS. 14-16 apply to FIGS. 17-18.

Figure 21:
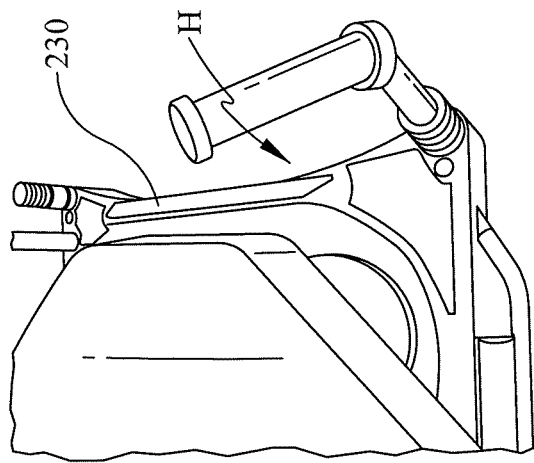
FIGS. 19-21 show a sixth embodiment which employs photoelectric panels.
Figure 20:
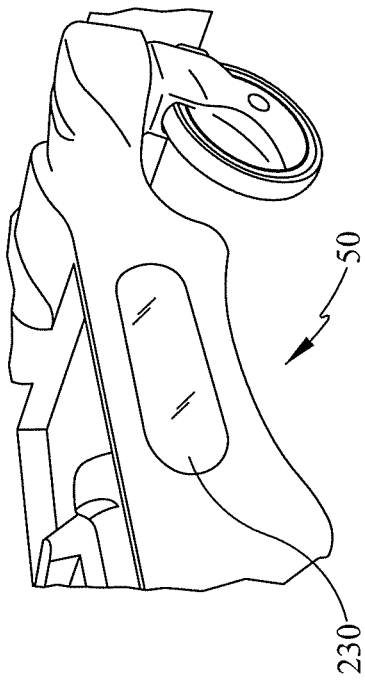
Figure 19:
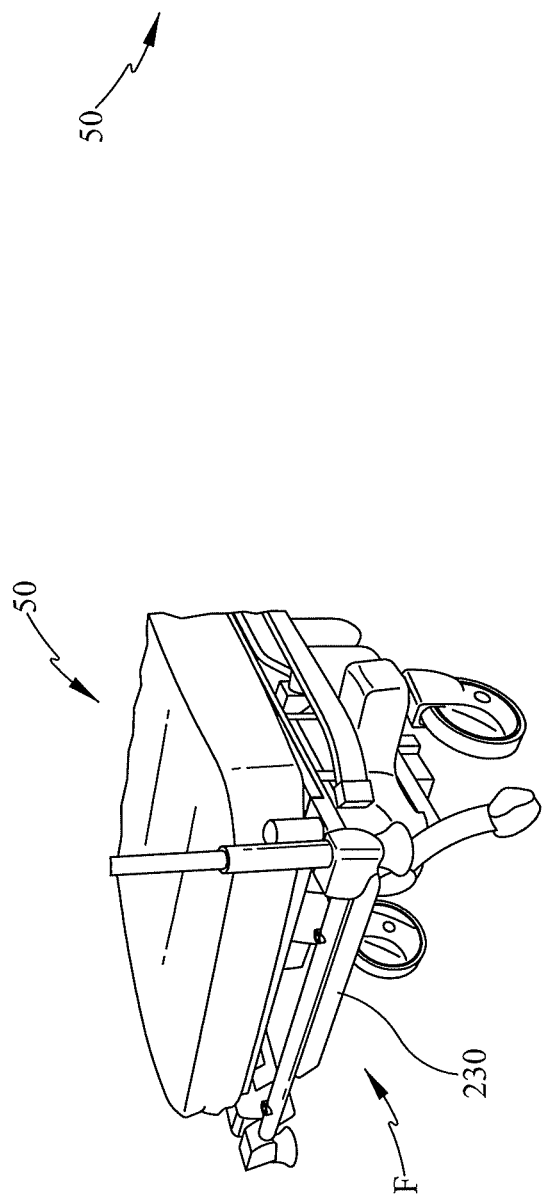

FIGS. 19-21 show variants of a sixth embodiment of an energy management system for a stretcher or other occupant support. In all three variants the energy management system includes a photoelectric panel 230 which converts light energy to electrical energy. FIG. 19 shows a panel affixed to the foot end F of the stretcher. FIG. 20 shows a panel which doubles as the stretcher manufacturer's logo. FIG. 21 shows a panel affixed to the head end H of the stretcher.

The photoelectric panels have the advantage that they can harvest energy from surrounding illumination even if the stretcher is stationary and even if its electrical components are not connected to mains power. The energy can be used to maintain or top off the charge on a battery. This yields the advantage that the battery can be charged or maintained at charge if a user forgets to connect the stretcher to mains power, or if the stretcher is located where mains power is not readily accessible. Alternatively or additionally the energy can be used to power the electrical components on the stretcher. This yields the advantage of making electrical energy available for use when the stretcher is being used for transport even if the battery had suffered partial or full depletion of charge prior to the current use of the stretcher.

FIGS. 22-25 show variants of a seventh embodiment of an energy management system for a stretcher or other occupant support. In all the variants the energy management system includes a piezoelectric generator which converts mechanical strain to electrical energy. The piezoelectric elements may be located at any place where they can be subjected to mechanical strain, thereby harvesting energy which would otherwise serve no useful purpose. Specific examples are described below.

Figure 22:
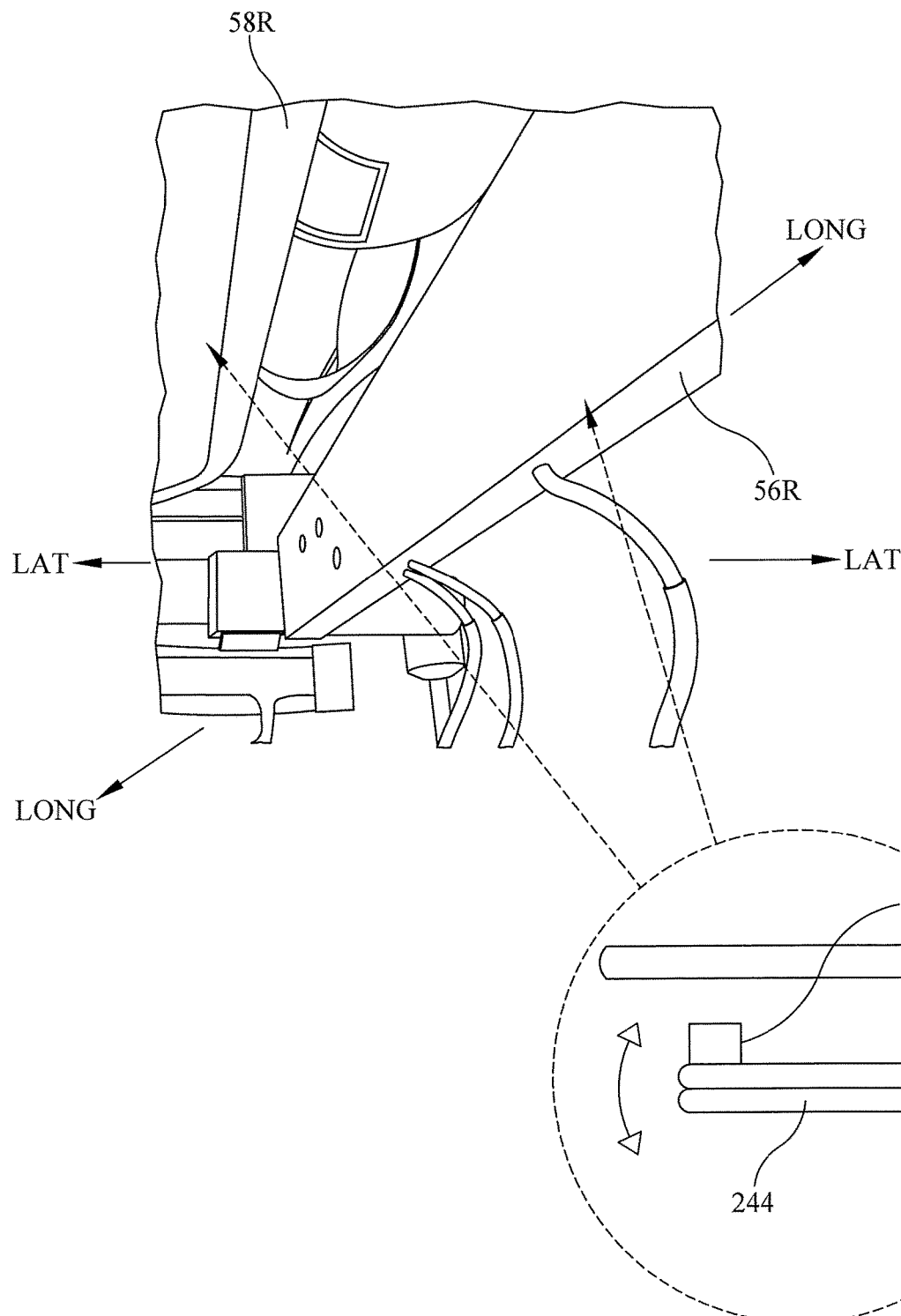
FIGS. 22-25 show variants of a seventh embodiment which employs piezoelectric generators, also referred to as piezoelectric elements.

FIG. 22 shows the underside of base frame 56 and elevatable frame 58. Longitudinal and lateral directional axes LONG, LAT are shown to provide directional references. Each frame includes a longitudinally extending rail 56R, 58R. As seen best in the inset to the drawing, a piezoelectric element 244 is cantilevered from the vertical-member. A weight 248 is affixed to the piezoelectric element. Vibrations attributable to occupant movement or movement of the stretcher cause the weight/piezoelectric element assembly to oscillate, thereby imparting mechanical strain to the piezoelectric element. The piezoelectric element converts the strain to electrical potential energy which may be harvested and used to operate electrical devices or to charge a battery.

Figure 23:
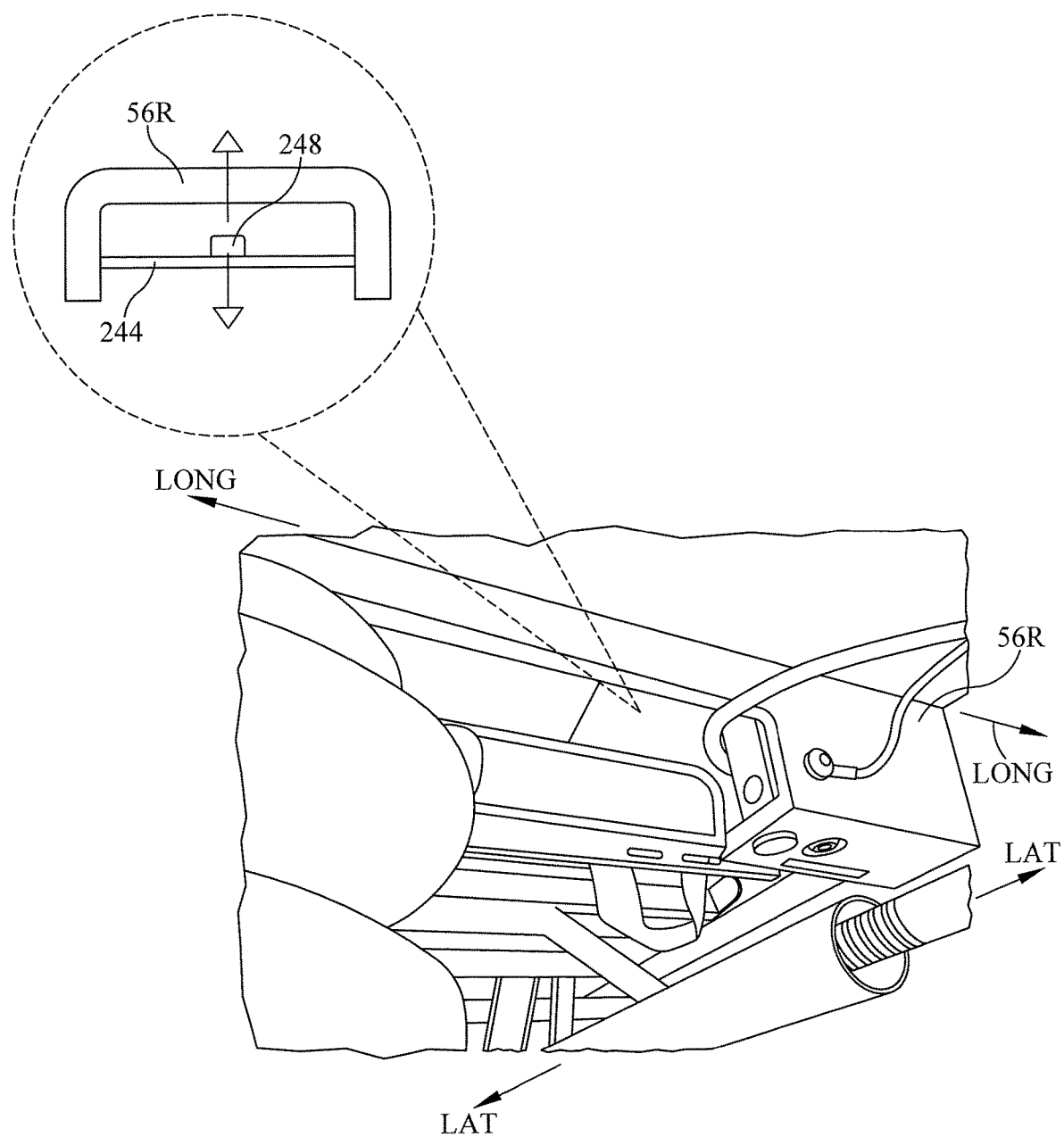

FIG. 23 shows the underside of base frame 56. The frame includes a longitudinally extending rail 56R. As seen best in the inset to the drawing, the rail has an inverted "U" cross section. The ends of a piezoelectric element 244 are affixed to the vertical members of the rail. A weight 248 is affixed to the piezoelectric element. Vibrations attributable to occupant movement or movement of the stretcher cause the weight/piezoelectric generator assembly to oscillate, thereby imparting mechanical strain to the generator. The piezoelectric generator converts the strain to electrical potential energy which may be harvested and used to operate electrical devices or to charge a battery.

Figure 24:
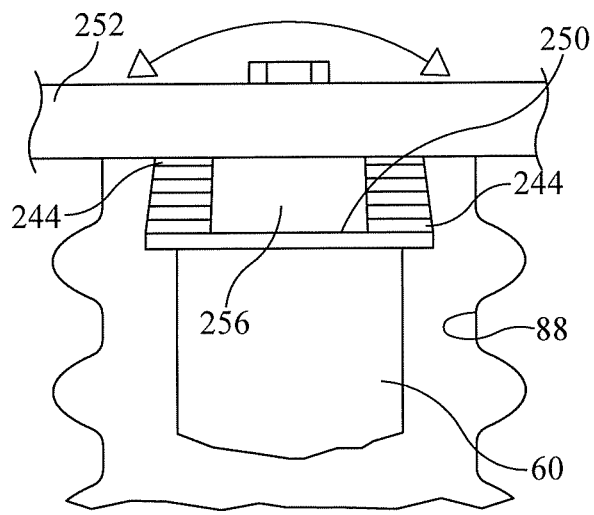

Referring to FIG. 24, hydraulic cylinder 60 (which is depicted more completely in FIG. 1) is secured, at its upper end 250, to a laterally extending cross member 252 of the stretcher elevatable frame. A damping element 256 resides vertically between the upper end of the hydraulic cylinder and the cross member. The damping element circumscribes the shank of the bolt. An assembly of one or more piezoelectric elements 244 circumscribes the damping element and is also sandwiched between the hydraulic cylinder and the cross member. Vibrations attributable to occupant movement or movement of the stretcher or forces exerted on the piezoelectric elements during operation of the hydraulic cylinder impart mechanical strain to the piezoelectric elements. The piezoelectric elements convert the strain to electrical potential energy which may be harvested and used to operate electrical devices or to charge a battery.

Figure 25:
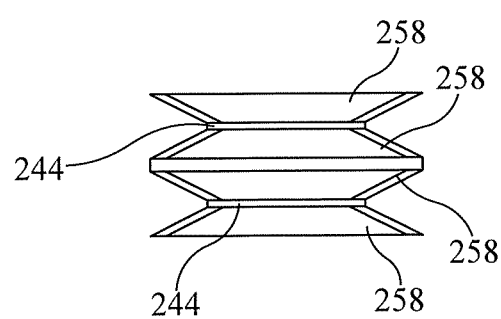

FIG. 25 shows a piezoelectric assembly similar to that seen in FIG. 24. The piezoelectric assembly of FIG. 25 comprises a stack of piezoelectric elements 244 alternating with spring washers 252 such as Belleville washers.

Although the piezoelectric elements of FIGS. 22-25 are shown in specific locations on the stretcher, they may be used at any location where they would be subject to strain and would therefore generate harvestable energy.

In the foregoing description the appliance to which generator 156 is coupled is an energy storage device such as a battery 160. However it may also be satisfactory to connect the generator directly to a power consuming appliance. In general, the system may be set up so that the power consuming appliance is one which receives electrical energy exclusively from the generator, or it may be one which selectively receives energy from the generator or from another source such as battery 160 or which concurrently receives energy from the generator and from another source such as battery 160. In addition it may be satisfactory to connect the output of the generator to other types of energy storage devices which need not be electrical in nature.

Figure 26:
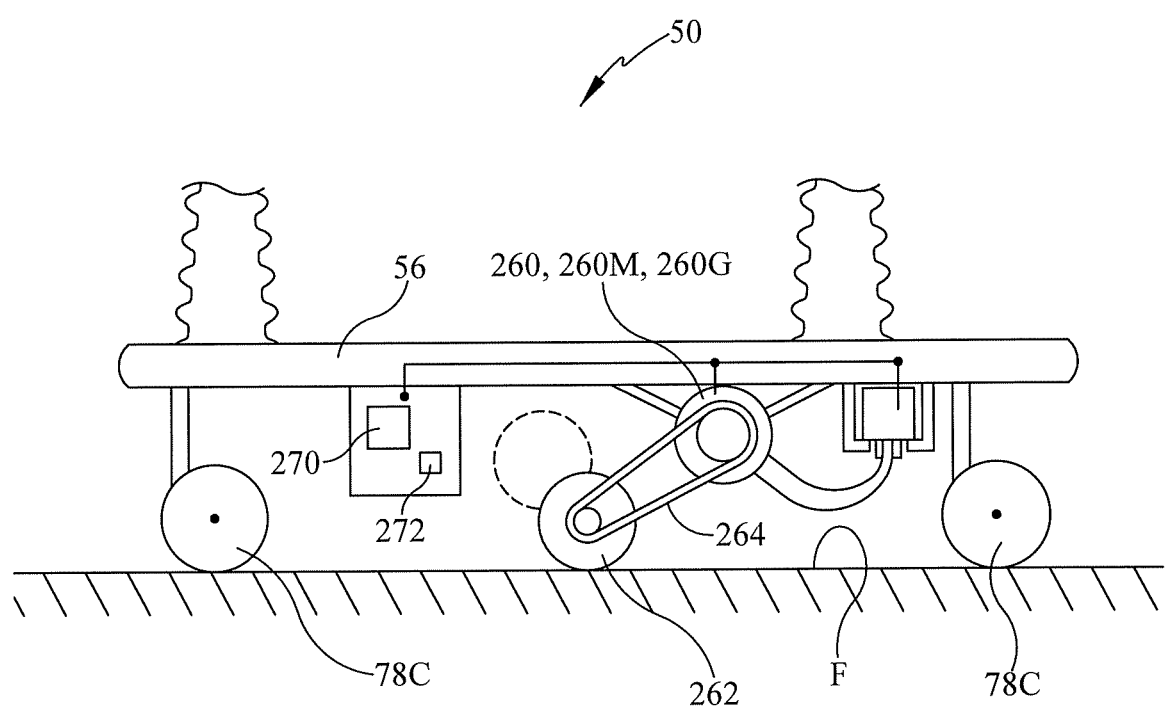
FIG. 26 is a schematic side elevation view showing a powered stretcher having a motor/generator (electromachine) a drive wheel, a controller, and a battery, the stretcher being operable in an active mode and in a deactivated mode.

FIG. 26 is a schematic side elevation view showing base frame 56 and casters 78C of a powered stretcher 50. The stretcher includes a motor 260M and a battery 160, both illustrated as mounted on base frame 56. As explained in more detail below the motor may operate as a generator 260G, and therefore 260M and 260G may be referred to as an electromachine 260, which is understood to be operable as either a motor or a generator. The stretcher also includes a drive wheel 262 connected to the motor, for example by a drive belt 264, and a drive wheel deployment mechanism, not illustrated. The connection between the drive wheel and the motor is referred to as a driving/driven relationship because either component may be used to drive the other. The stretcher also includes a processor or controller 270 and a memory 272 containing instructions which are executable by the controller.

In an active mode of operation the deployment mechanism is commanded to deploy the drive wheel into contact with the floor F (solid lines). Sensors on the stretcher sense the forces being applied by the caregiver to handle 40 (e.g. as seen in FIG. 1). Controller 270, acting in accordance with instructions 272, responds to the outputs of the sensors by commanding motor 260M to operate at a particular speed and in a particular direction (i.e. forward or reverse). As a result, the drive wheel helps propel the stretcher by augmenting the force applied by the caregiver. In a deactivated mode of operation, the deployment mechanism is commanded to retract the drive wheel off the floor (dashed lines). In the nonpowered mode there is no augmentation of the force applied by the caregiver.

Figure 27:
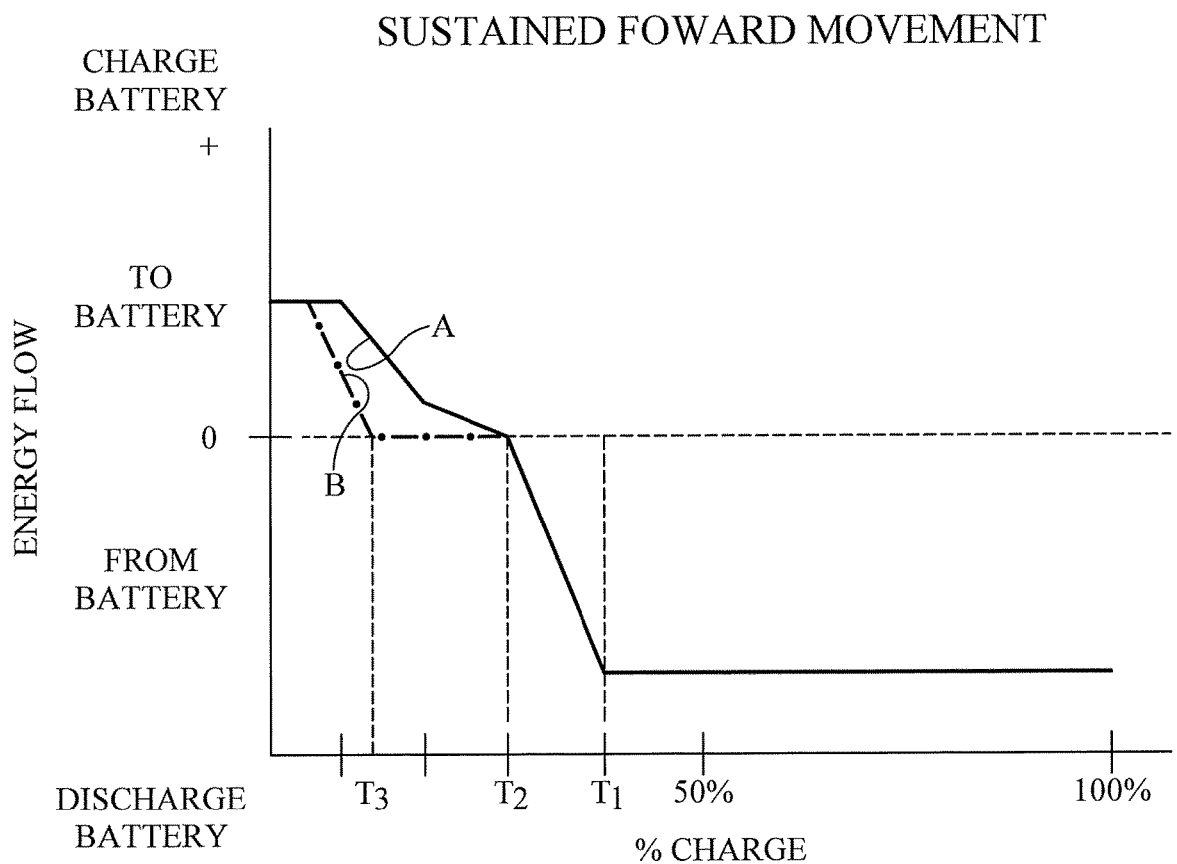
FIGS. 27-29 are graphs of energy transfer versus battery charge for the stretcher if FIG. 26.
Figure 28:
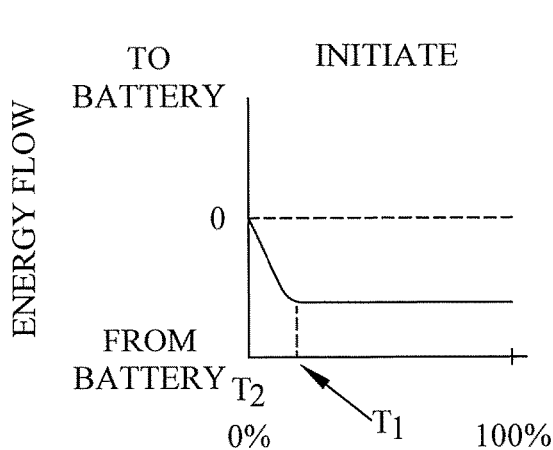
Figure 29:
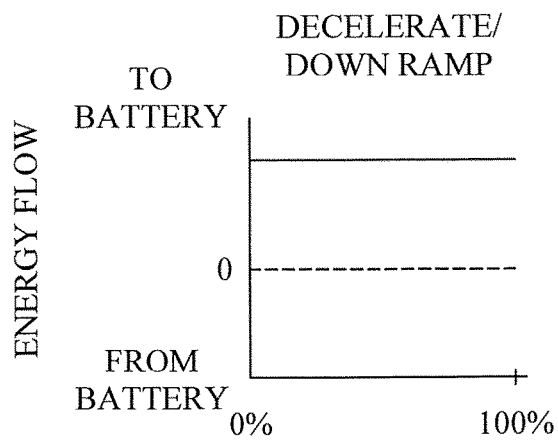

FIGS. 27-29 illustrate different variants of the active mode. Each of FIGS. 27-29 is a relationship between energy transfer as a function of battery state, i.e. as a function of battery charge.

Referring first to FIG. 27, which shows the case of sustained forward movement, if the battery charge exceeds a first threshold $T_1$ (e.g. 40%) the battery is used to power the motor, as described above, in order to augment the force applied to the stretcher by the caregiver.

If the battery charge is below $T_1$ but above threshold $T_2$, controller 270 still causes the battery to power the motor but limits the amount of energy drawn from the battery to power the motor to be less than the amount drawn if battery charge were at least $T_1$. As shown in the illustration, the amount of energy drawn from the battery decreases with decreasing charge.

If the battery charge is less than $T_2$, the controller causes energy draw from the battery to cease. Instead, the motor acts as a generator 260G, and the energy imparted to the drive wheel (as a result of the caregiver pushing the stretcher) powers the generator, causing it to recharge the battery. As seen in the illustration, the amount of caregiver energy diverted to charging the battery increases with decreasing battery charge. In one embodiment the controller shifts abruptly from drawing on the battery to charging the battery (solid line segment A). In another embodiment the controller terminates draw on the battery at threshold $T_2$ but does not cause energy transfer to the battery until the battery is drained to charge threshold $T_3$ (dash-dot line segment B).

FIG. 27 shows the case of sustained forward movement of the stretcher. FIG. 28 shows the case in which the stretcher is initially at rest, and a caregiver must exert a force to accelerate the stretcher to a desired speed. In that case the controller ensures that none of the caregiver's effort is diverted to charging the battery. $T_2$, the boundary between energy transfer from the battery and energy transfer to the battery, is at 0% charge.

FIG. 29 shows the case of a stretcher which a caregiver is attempting to decelerate. In that case, all of the kinetic energy of the drive wheel is used to drive the generator to charge the battery. This also helps decelerate the stretcher. FIG. 29 also illustrates the case of a stretcher rolling down a ramp or similar incline. All the energy of the drive wheel is used to drive the generator, thereby charging the battery and retarding acceleration of the stretcher down the ramp.

One possible way to distinguish among the sustained case of FIG. 27, the initial acceleration of FIG. 28 and deceleration of FIG. 29 is by equipping the stretcher with an accelerometer. Readings from the accelerometer may be augmented by readings from a stretcher speed sensor (e.g. a tachometer which senses speed of the drive wheel and/or casters) to better distinguish between steady state translation, acceleration, and deceleration. An inclinometer may be useful to determine if the stretcher is on a ramp.

Figure 30:
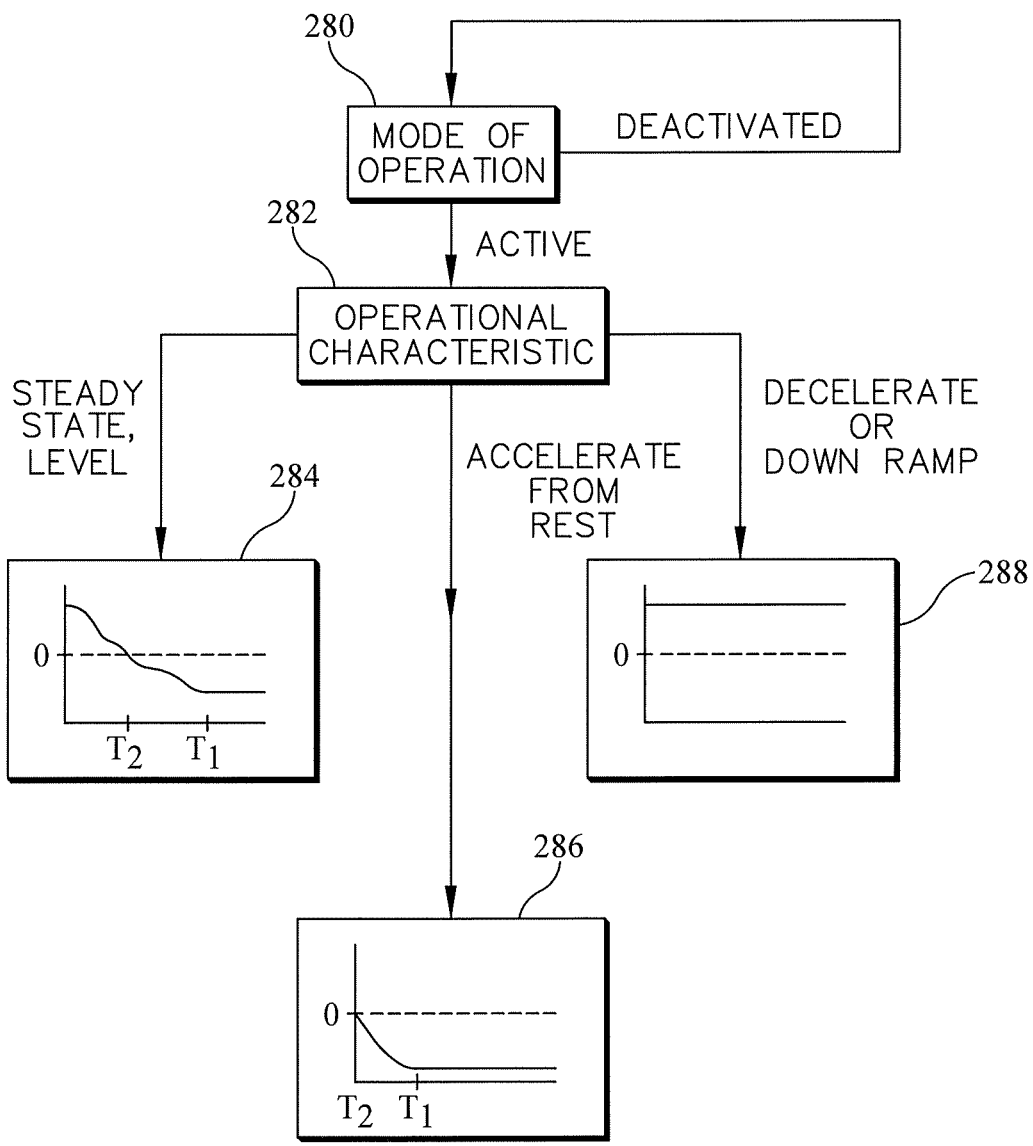
FIG. 30 is a block diagram of operation of the controller of FIG. 26.

FIG. 30 is a controller block diagram illustrating the above. At block 280 the controller determines if the stretcher is in the active or deactivated mode of operation. If the stretcher is in the active mode the controller branches to block 282 where it distinguishes between the three operational characteristics: steady state and level, acceleration from rest, and deceleration or traveling down a ramp. Depending on which characteristic is perceived, the controller branches to block 284, 286 or 288, which correspond respectively to FIGS. 27, 28 and 29.

The regulation of energy transfer (both amount and direction) need not be a function of battery charge exclusively. Instead, the regulation of energy transfer may be a function of one or more additional inputs as set forth below:

A) the speed at which the occupant support is moving or at which one of the caster wheels is rotating or at which the drive wheel is rotating.
B) acceleration or deceleration of the occupant support,
C) angle of inclination of the stretcher relative to the geographic horizon,
D) direction of movement of the stretcher, and
E) direction of force exerted on handles which a user uses to maneuver the occupant support.

The notion of reversing the roles of an electromachine between that of a motor and that of a generator and regulating it as in FIGS. 27-30 may also be applicable to the fourth embodiment of FIGS. 14-16, and to the fifth embodiment of FIGS. 17-18.

Although this disclosure refers to specific embodiments, it will be understood by those skilled in the art that various changes in form and detail may be made without departing from the subject matter set forth in the accompanying claims.

The invention claimed is:

1. An occupant support comprising:
   a framework comprised of a frame and an orientation adjustable deck section supported by the frame;
   a lockable gas spring whose components include a piston assembly coupled to one of the frame and the deck section and a cylinder coupled to the other of the frame and the deck section, the piston assembly including a piston and a connecting rod, the piston dividing an interior of the cylinder into an isolated compartment and a non-isolated compartment;
   an outlet of the non-isolated compartment of the lockable gas spring;
   a turbine which receives fluid which flows out of the non-isolated compartment;
   an accumulator flowisely intermediate the outlet and the turbine, the accumulator having an intake which receives fluid from the outlet of the lockable gas spring and a discharge port;
   a reverse flow check valve which resists fluid flow into the accumulator by way of the discharge port and enables fluid flow out of the accumulator by way of the discharge port, wherein the piston moves longitudinally within the cylinder in conjunction with a change of orientation of the deck section thereby changing the volume of the non-isolated compartment, whereby a decrease in the volume of the non-isolated compartment expels air out of the non-isolated compartment and through the turbine in a first direction, and a decrease in the volume of the non-isolated compartment draws air through the turbine in a second direction and into the non-isolated compartment; and
an electrical generator coupled to the turbine.

2. The occupant support of claim 1, further comprising: a conduit extending from the non-isolated compartment to the turbine.

3. The occupant support of claim 1, further comprising: an inlet and an outlet of the non-isolated compartment;
an outflow check valve which resists fluid flow out of the non-isolated compartment by way of the inlet and admits ambient fluid into the non-isolated compartment; and
an inflow check valve which resists fluid flow into the non-isolated compartment by way of the outlet and enables fluid flow out of the non-isolated compartment.

4. The occupant support of claim 1, wherein lockability of the lockable gas spring is permissive lockability.

5. The occupant support of claim 1, further comprising: a second gas spring including a piston assembly coupled to one of the frame and the deck section and a cylinder coupled to the other of the frame and the deck section, the second gas spring operable to resist a change in angular orientation of the deck section from a first orientation to a second orientation which is more horizontal than the first orientation, and to assist the change in angular orientation of the deck section from the second orientation to the first orientation.

6. The occupant support of claim 1, further comprising: an upstream conduit segment extending from the outlet to the accumulator intake and a downstream conduit segment extending from the accumulator reverse flow check valve to the turbine.

7. An occupant support comprising:
a framework comprised of a frame and an orientation adjustable deck section supported by the frame;
a lockable gas spring whose components include a piston assembly coupled to one of the frame and the deck section and a cylinder coupled to the other of the frame and the deck section, the piston assembly including a piston and a connecting rod, the piston dividing an interior of the cylinder into an isolated compartment and a non-isolated compartment;
a turbine which receives fluid which flows out of the non-isolated compartment;
a reverse flow check valve which resists fluid flow into an accumulator disposed between the lockable gas spring and the turbine by way of a discharge port and enables fluid flow out of the accumulator by way of the discharge port, wherein the piston moves longitudinally within the cylinder in conjunction with a change of orientation of the deck section thereby changing the volume of the non-isolated compartment, whereby a decrease in the volume of the non-isolated compartment expels air out of the non-isolated compartment and through the turbine in a first direction, and a decrease in the volume of the non-isolated compartment draws air through the turbine in a second direction and into the non-isolated compartment; and
an electrical generator coupled to the turbine.

8. The occupant support of claim 7, further comprising: a conduit extending from the non-isolated compartment to the turbine.

9. The occupant support of claim 7, further comprising: an inlet and an outlet of the non-isolated compartment.

10. The occupant support of claim 9, further comprising: an outflow check valve which resists fluid flow out of the non-isolated compartment by way of the inlet and admits ambient fluid into the non-isolated compartment.

11. The occupant support of claim 9, further comprising: an inflow check valve which resists fluid flow into the non-isolated compartment by way of the outlet and enables fluid flow out of the non-isolated compartment.

12. The occupant support of claim 7, wherein lockability of the lockable gas spring is permissive lockability.

13. The occupant support of claim 7, further comprising: a second gas spring including a piston assembly coupled to one of the frame and the deck section and a cylinder coupled to the other of the frame and the deck section, the second gas spring operable to resist a change in angular orientation of the deck section from a first orientation to a second orientation which is more horizontal than the first orientation, and to assist the change in angular orientation of the deck section from the second orientation to the first orientation.

14. An occupant support comprising:
a framework comprised of a frame and an orientation adjustable deck section supported by the frame;
a lockable gas spring having a cylinder and a piston assembly that includes a piston and a connecting rod, the piston dividing an interior of the cylinder into an isolated compartment and a non-isolated compartment;
a turbine which receives fluid which flows out of the non-isolated compartment;
a reverse flow check valve which resists fluid flow into an accumulator and enables fluid flow out of the accumulator, wherein the piston moves within the cylinder in conjunction with a change of orientation of the deck section, whereby a decrease in a volume of the non-isolated compartment expels air out of the non-isolated compartment and through the turbine in a first direction, and a decrease in the volume of the non-isolated compartment draws air through the turbine in a second direction and into the non-isolated compartment; and
an electrical generator coupled to the turbine.

15. The occupant support of claim 14, further comprising: a conduit extending from the non-isolated compartment to the turbine.

16. The occupant support of claim 14, further comprising: an inlet and an outlet of the non-isolated compartment.

17. The occupant support of claim 16, further comprising: an outflow check valve which resists fluid flow out of the non-isolated compartment by way of the inlet and admits ambient fluid into the non-isolated compartment.

18. The occupant support of claim 16, further comprising: an inflow check valve which resists fluid flow into the non-isolated compartment by way of the outlet and enables fluid flow out of the non-isolated compartment.

19. The occupant support of claim 14, wherein lockability of the lockable gas spring is permissive lockability.

20. The occupant support of claim 14, further comprising: a second gas spring including a piston assembly coupled to one of the frame and the deck section and a cylinder coupled to the other of the frame and the deck section, the second gas spring operable to resist a change in angular orientation of the deck section from a first orientation to a second orientation which is more horizontal than the first orientation, and to assist the change in angular orientation of the deck section from the second orientation to the first orientation.

\* \* \* \* \*